United States Patent

Kerkmann et al.

[11] Patent Number: 5,818,038
[45] Date of Patent: Oct. 6, 1998

[54] STEERING WHEEL ANGULAR POSITION SENSOR

[76] Inventors: Detlev Kerkmann, Erienweg 1, 58769 Nachrodt; Maik Frenzel, Am Ramsberg 44, 58509 Ludenscheid; Horst Sudholz, Schubertring 5, 26386 Wilhelmshaven, all of Germany

[21] Appl. No.: 749,005

[22] Filed: Nov. 14, 1996

[30] Foreign Application Priority Data

Nov. 17, 1995 [DE] Germany .......................... 195 42 897.8

[51] Int. Cl.⁶ ........................................................ G01D 5/34
[52] U.S. Cl. ................................ 250/231.13; 250/231.14; 341/13
[58] Field of Search ........................ 250/231.13, 231.14; 341/13, 31

[56] References Cited

U.S. PATENT DOCUMENTS 4,678,908  7/1987  Le Plante ........................... 250/231.14
4,680,466  7/1987  Kuwahara et al. ................ 250/231.14

*Primary Examiner*—Stephone B. Allen
*Attorney, Agent, or Firm*—Brooks & Kushman, P.C.

[57] ABSTRACT

Angle sensor, in particular for the steering gear of vehicles, with several sensor elements of the same design which are positioned separately in a circumferential direction on a facility which is fastened in a fixed position to the installation aligned at a vertical plane to the axis of the installation on a circular curve concentric with the axis of the installation and which cooperate with a code ring which is coupled to a component of the installation which can rotate around the axis. The angle sensor reduces space requirements and simplifies assembly. The code ring is equipped with n(n>1) geometrically equal code ring segments, each featuring the same codification. The sensor elements and each code ring segment extend over circumferential angle of $(360/n)°$.

14 Claims, 2 Drawing Sheets

ND POSITION
STEERING WHEEL ANGULAR POSITION SENSOR

TECHNICAL FIELD

The invention relates to an angle sensor, in particular for the steering gear of vehicles.

BACKGROUND ART

In DE 43 00 663 C1, an angle sensor is described, in which a printed circuit board is incorporated which extends over a full circle. As a result of this, the printed circuit board requires considerable space. Assembly is complicated because the printed circuit board must be assembled above the installation which functions as the steering gear, or above the outer steering column pertaining to the steering gear.

SUMMARY OF THE INVENTION

It is an aim of the invention to reduce the space requirement for an angle sensor and to simplify assembly.

This aim is achieved by a code ring which is equipped with n (n>1) code ring segments, each of which is of the same geometrical structure and each featuring the same codification. The sensor elements and each code ring segment extend over a circumferential angle of $(360/n)°$.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
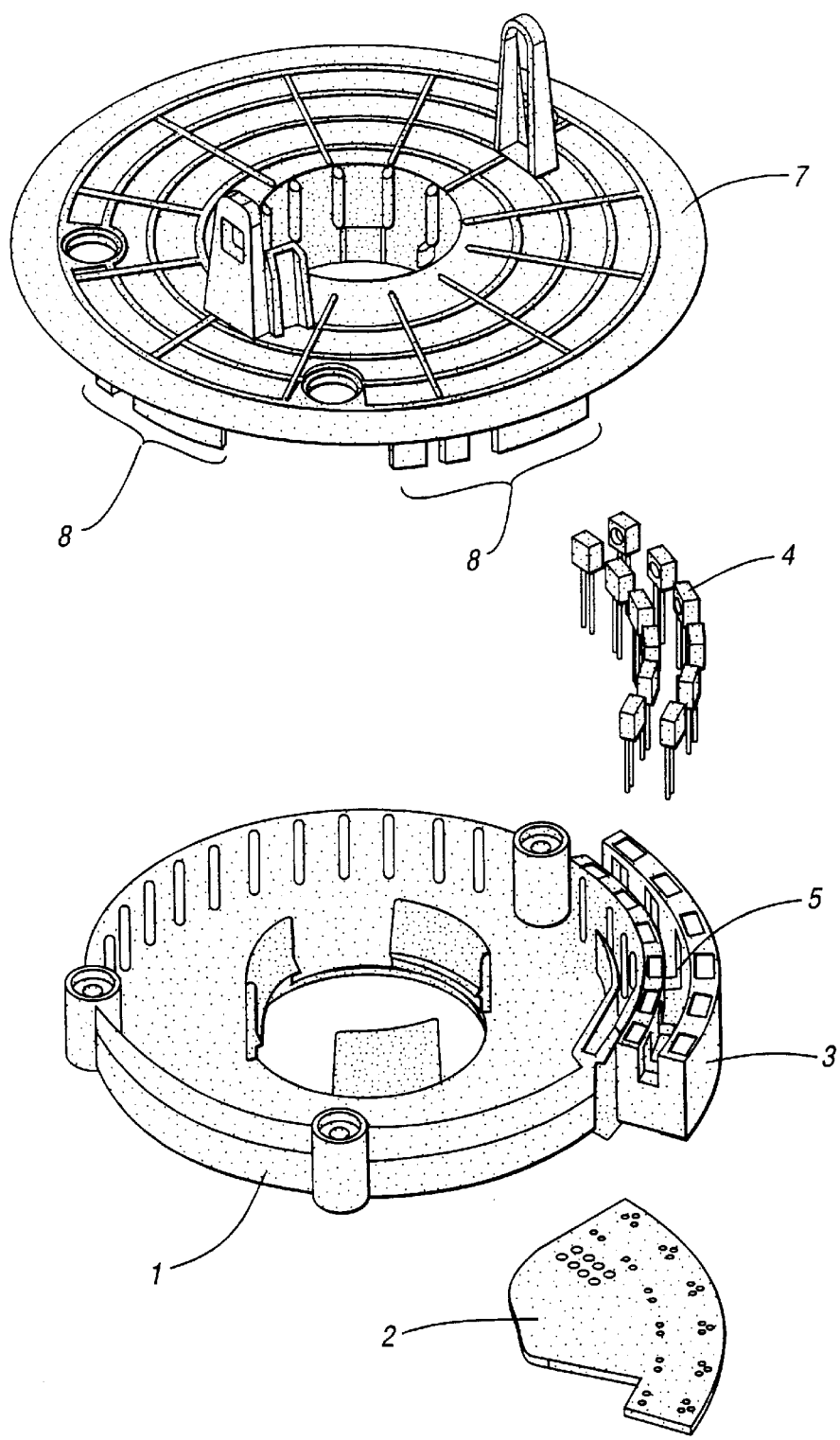
FIG. 1 represents an exploded illustration of an initial exemplary version.

A circular stator 1 is mounted in a non-rotational manner concentric with the installation of a steering shaft of the steering gear or the steering column of a vehicle. A facility such as a printed circuit board 2 is affixed to the stator 1 which is designed as a sector-shaped segment and extends over a circumferential angle of $72°=(360/5)°$. The stator 1 features a ring segment housing 3 aligned with the printed circuit board 2 and extending over a circumferential angle of 72°. It retains six sensor elements or optical transducer units 4 positioned at equal angular spaces of 12°. The transmitting elements and receiver elements of the optical transducer units 4 have direct contact with the printed circuit board 2 and are positioned opposite one another on either side of an annular gap 5. The annular gap 5 is concentric with the axis of the steering shaft.

A rotary disc is coupled with the steering wheel and designed as a code aperture ring 7 with five equal aperture ring segments 8, each of which extends over a circumferential angle of 72°. The aperture ring segments 8 generate a unit-distance, interlinked code in conjunction with the optical transducer units 4. In this specific case, it is a 6-bit code.

By way of continuous evaluation, the unit-distance, interlinked code makes it possible to determine the exact position, even after several steering wheel rotations. A reference value is obtained independent of the angle sensor by a synchronization measurement of the vehicle wheels, by turning the steering wheel through the complete steering range or by another initialization procedure.

The steering angle sensor illustrated in FIG. 1 is a component of a so-called volute spring cassette which is provided to transmit signals or energy from a stationary to a rotating part of the steering gear of a vehicle.

Figure 2:
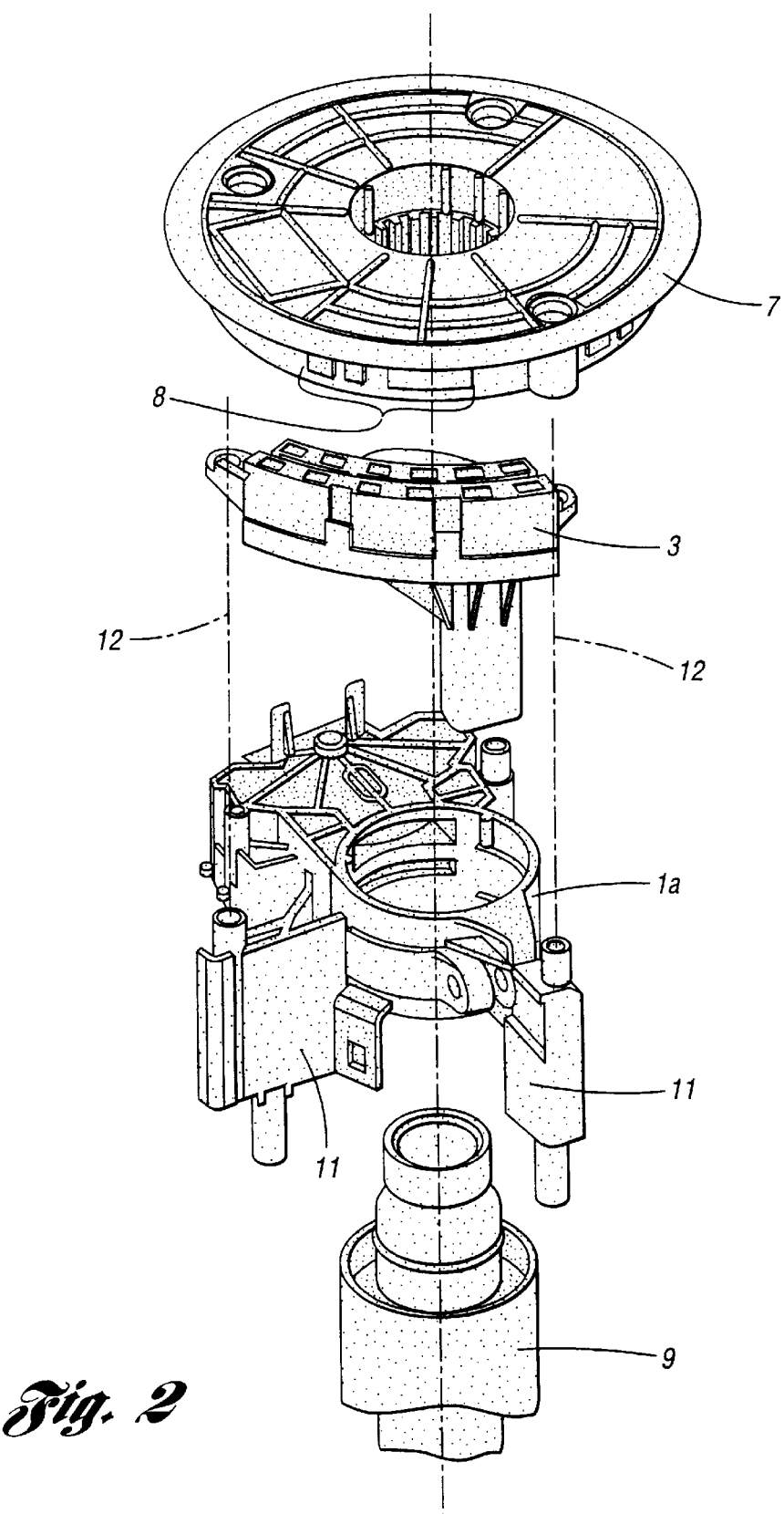
FIG. 2 represents an exploded illustration of a second exemplary version.

In the version according to FIG. 2, a mounting frame (1a) which is also fixed to the steering gear or to the steering column 9 bears on consoles 11, and a ring segment housing 3, the mounting devices 12 of which are shown diagrammatically. The segment housing 3 features a ring segment-shaped gap 5, on both sides of which the optical transducers are positioned. The code aperture ring 7 with the aperture ring segments 8 is constructed and positioned in the same way as described in connection with FIG. 1.

The invention deviates from the technological state of art in that the entire angle sensor is reduced to a segment of the circumference so that the space requirement is limited to this segment of the full circle. Assembly is considerably simplified since the segment can be mounted laterally on the steering column.

In conjunction with m-sensor elements, the code ring segments engender a unit-distance, interlinked m-bit-code through which the angular position within each segment is uniquely identified. Detection of the angle beyond the boundaries of a segment occurs e.g. due to the initialization of the system by way of a reference value and the subsequent (electronic) evaluation of the segments which takes place in a signed manner in accordance with the direction of rotation. It is also possible to differentiate the segments by way of an additional identification characteristic such as different transmission or reflection properties of the code ring segments by direct or reflective optical transducers.

The optical transducers are preferably constructed in such a way that optical transducer units are positioned on a printed circuit board which is on a vertical plane to the axis of the installation and act as sensor elements. A code aperture ring 7 is positioned in an annular gap formed by the optical transducer elements and serves as a code ring.

A further version of the optical transducers is realized by providing reflective optical transducer units positioned on a printed circuit board adjusted to a plane which is vertical to the axis of the installation as sensor elements and a reflective code ring serves as a code ring.

It is specifically intended that the reflective optical transducer units pertain to the outer and/or inner circumference of the reflective code ring.

A further possibility for realization consists of providing magnetic field sensors as sensor elements which are actuated either by a permanent magnetic code ring or which each cooperate with a magnet, whereby a ferromagnetic (low-retentivity) code aperture ring is employed.

One arrangement of the magnetic field sensors is distinguished by the fact that each magnetic field sensor and the pertaining magnet are arranged successively on one side of the ferromagnetic code aperture ring.

Favourable dimensions for mounting the angle sensor can be achieved by having a circumferential angle of $(360/5)°=72°$.

Thus, the angle sensor has several sensor elements of the same design which are positioned circumferentially on a facility which is fastened in a fixed position to the installation in a vertical plane to the axis of the installation and which cooperate with a code ring which is coupled to a component of the installation which can rotate around the axis.

The above objects and other objects, features, and advantages of the present invention are readily apparent from the following detailed description of the best mode for carrying out the invention when taken in connection with the accompanying drawings.

What is claimed is:

1. A steering wheel angular position sensor for a steering gear in vehicles, the steering gear having a rotatable shaft attached to a steering wheel, the sensor comprising:

a ring housing segment (3) positioned circumferentially on a circular stator (1) fastened perpendicular to the shaft on a circle concentric with the shaft;

a plurality of sensor element (4) positioned circumferentially on bthe ring housing segment adjacent an annular gap (5) of the ring housing segment concentric with the shaft;

a rotary disk engaged to the steering wheel for rotation with the shaft, the rotary disk having a code aperture ring (7) equipped with n (n>1) code ring segments (8) each having the same geometrical structure and codification, the code ring segments being insertable into the annular gap of the ring housing segment as the shaft rotates to cooperate with the sensor elements to generate a unit distance, interlinked m-bit code in conjunction with respective m-sensor elements indicative of the angular position of the steering wheel, wherein the sensor elements and each code ring segment extend over a circumferential angle of $(360/n)°$.

2. A sensor in accordance with claim 1, wherein the sensor elements comprise:

optical transducer units (4) positioned in communication with a printed circuit board (2), wherein each optical transducer unit comprises an optical transmitter and an optical receiver positioned opposite one another across the annular gap of the ring housing segment.

3. A sensor in accordance with claim 1, wherein the sensor elements comprise:

reflective optical transducer units positioned on a printed circuit board (2); and the code aperture ring (7) comprises a reflective code aperture ring.

4. A sensor in accordance with claim 1, wherein the sensor elements comprise magnetic field sensors; and the code aperture ring comprises a permanent magnetic ring with a codified magnetization.

5. A sensor in accordance with claim 1, wherein the sensor elements include:

magnetic field sensors, each of which cooperates with a magnet; and the code aperture ring (7) comprises a ferromagnetic code aperture ring.

6. A sensor in accordance with claim 5, wherein each magnetic field sensor and each pertaining magnet are positioned successively on one side of the ferromagnetic code aperture ring adjacent the annular gap of the ring housing segment.

7. A sensor in accordance with claim 5, wherein each magnetic field sensor and each pertaining magnet are positioned opposite each other on either side of the ferromagnetic code aperture ring adjacent the annular gap of the ring housing segment.

8. A sensor in accordance with claim 1, wherein the sensor elements (4) have an equal angular displacement between each other.

9. A sensor in accordance with claim 8, wherein the sensor elements comprise:

optical transducer unit (4) positioned in communication with a printed circuit board (2), wherein each optical transducer unit comprises an optical transmitter and an optical receiver positioned opposite one another across the annular gap of the ring housing segment.

10. A sensor in accordance with claim 8 wherein the sensor elements comprise:

reflective optical transducer units positioned on a printed circuit board (2); and the code aperture ring (7) comprises a reflective code aperture ring.

11. A sensor in accordance with claim 8, wherein the sensor elements comprise magnetic field sensors; and the code aperture ring comprises a permanent magnetic ring with a codified magnetization.

12. A sensor in accordance with claim 8, wherein the sensor elements include:

magnetic field sensors, each of which cooperates with a magnet; and the code aperture ring (7) comprises a ferromagnetic code aperture ring.

13. A sensor in accordance with claim 11, wherein each magnetic field sensor and each pertaining magnet are positioned successively on one side of the ferromagnetic code aperture ring adjacent the annular gap of the ring housing segment.

14. A sensor in accordance with claim 12, wherein each magnetic field sensor and each pertaining magnet are positioned opposite each other on either side of the ferromagnetic code aperture ring adjacent the annular gap of the ring housing segment.

* * * * *

UNITED STATES PATENT AND TRADEMARK OFFICE
CERTIFICATE OF CORRECTION

PATENT NO. : 5,818,038
DATED : October 6, 1998
INVENTOR(S) : DETLEV KERKMANN, et al.

It is certified that error appears in the above-identified patent and that said Letters Patent is hereby corrected as shown below:

Column 3, Line 13, delete "element" and insert --elements--.

Column 3, Line 14, delete "bthe" and insert --the--.

Column 4, Line 18, delete "unit" and insert --units--.

Column 4, Line 39, delete "claim 11" and insert --claim 12--.

Signed and Sealed this

Sixth Day of April, 1999

Attest:

Q. TODD DICKINSON

Attesting Officer

Acting Commissioner of Patents and Trademarks